United States Patent [19]

Lukas et al.

[11] 4,168,026
[45] Sep. 18, 1979

[54] APPARATUS FOR BREAKING AN OPTICAL FIBRE

[75] Inventors: Helmut H. Lukas, Carleton Place; Jack F. Dalgleish, Ottawa, both of Canada

[73] Assignee: Northern Telecom Limited, Montreal, Canada

[21] Appl. No.: 919,664

[22] Filed: Jun. 27, 1978

[51] Int. Cl.² .......................... B26F 3/00; C03B 33/06
[52] U.S. Cl. .................................. 225/96.5; 225/101; 225/105
[58] Field of Search ...................... 225/96.5, 101, 105, 225/2; 65/DIG. 7

[56] References Cited
U.S. PATENT DOCUMENTS

| | | | |
|---|---|---|---|
| 4,017,013 | 4/1977 | Hawk et al. | 225/96.5 |
| 4,036,419 | 7/1977 | Hensel et al. | 225/96.5 |
| 4,074,840 | 2/1978 | Fulenwider et al. | 225/96.5 |

*Primary Examiner*—Frank T. Yost
*Attorney, Agent, or Firm*—Sidney T. Jelly

[57] ABSTRACT

A tool for breaking an optical fibre comprises an elongate base member and an elongate top member pivotally connected at a rear end. An elongate cam member slides longitudinally in the base member, being actuated by pivoting of the top member. At the front end of the base member are a front pair of opposed gripping jaws and a further, rear, pair of gripping jaws are spaced from the front jaws. A bending member is positioned between the two pairs of jaws. Pivotting of the top member towards the base member actuates the cam member which in turn first closes the front jaws, then the rear jaws. The rear jaws then pivot backwards to tension the fibre and then the bending member moves up to cause the fibre to bend over an arcuate top surface. Finally a pivotally mounted scoring member in the top member is actuated to sweep a sharp edge across the fibre to initiate a crack, which propagates across the fibre.

16 Claims, 17 Drawing Figures

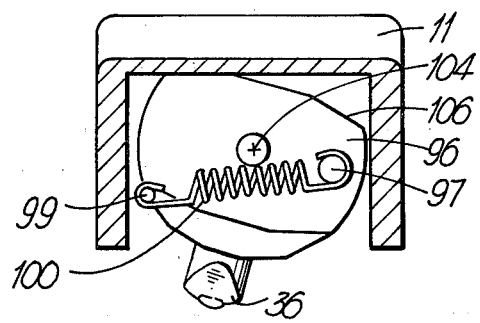
Fig-12a-
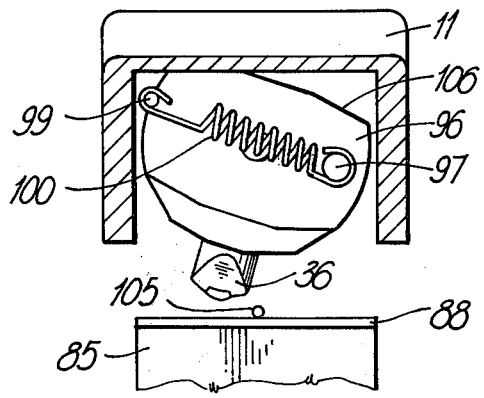
Fig-12b-
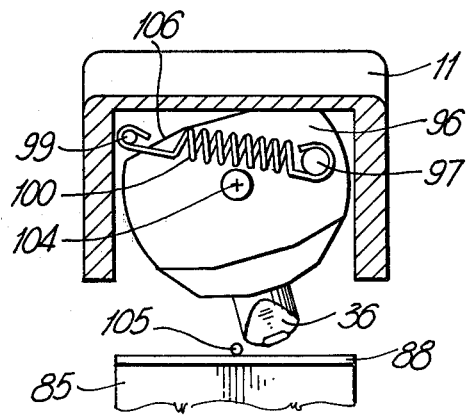
Fig-12c-

4,168,026

APPARATUS FOR BREAKING AN OPTICAL FIBRE

This invention relates to an apparatus for breaking an optical fibre, so as to provide a flat and perpendicular end face on a fibre, for low-loss connections.

It has been proposed to break optical fibres by bending over a controlled radius and then drawing a cutting edge, such as a file, over the bent fibre. This initiates a crack which propagates through the fibre, to produce a smooth, flat, perpendicular surface at the fibre end.

The present invention provides a small, simple hand-operable device which applies bending and tension to the fibre and then scores the fibre surface to produce breaking, the sequence of operations being done in one motion. Once a cycle has been commenced, it is carried through to completion before the apparatus returns to an initial condition, and consistently good breaks are produced.

Broadly, the apparatus comprises a base member having a longitudinally sliding cam member actuated by a top or hand member, the movement of the cam member sequentially gripping a fibre at two spaced apart positions and then tensioning and bending the fibre between the gripping positions. Continued movement of the top or hand member causes triggering of a scoring member which moves across the fibre at a position between the gripping positions and initiates a crack in the fibre.

The invention will be readily understood by the following description in conjunction with the accompanying drawings, in which.

Figure 4:
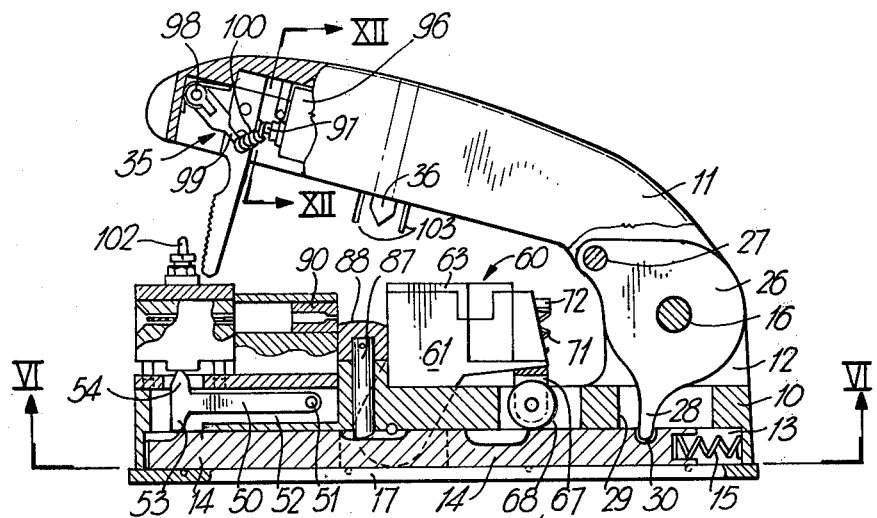
FIG. 4 is a longitudinal cross-section through the apparatus of FIG. 1, generally on the line IV—IV of FIG. 1.
Figure 6:
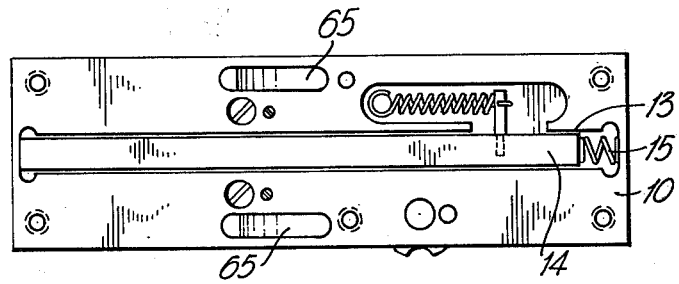
FIG. 6 is a cross-section on the line VI—VI of FIG. 4.
Figure 11:
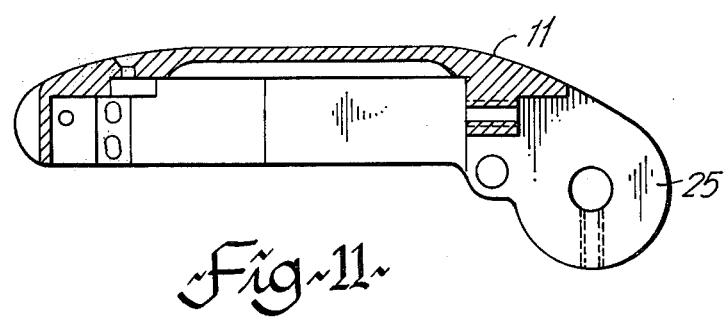
Figure 10:
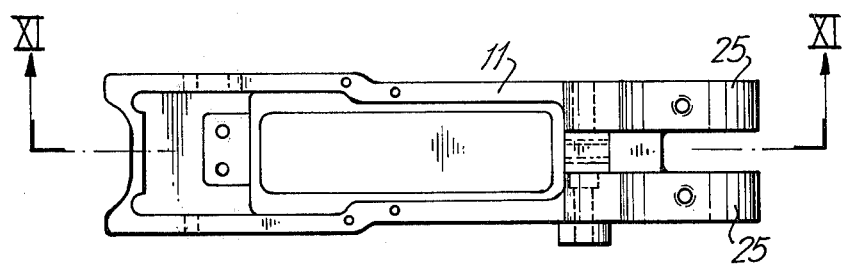
Figure 7:
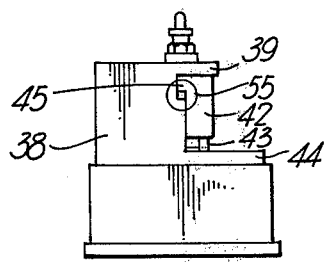
FIG. 7 is an end view in the direction of the arrow B in FIG. 1, of the base member.
Figure 8:
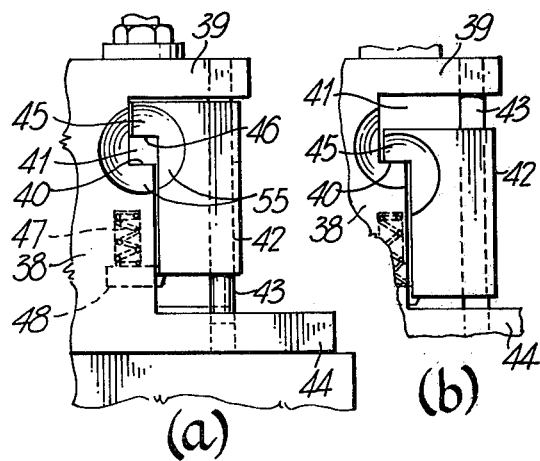
Figure 9:
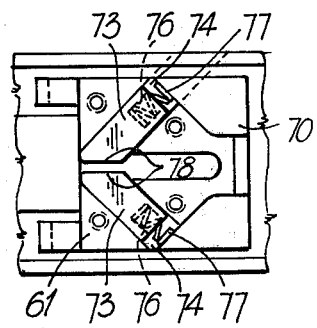
Figure 13:
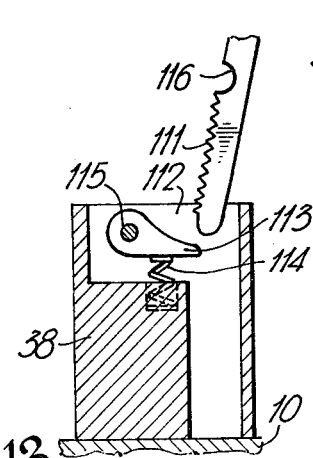
Figure 14:
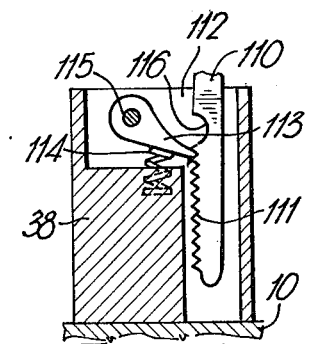

FIGS. 8(a) and 8(b) are enlarged views of part of FIG. 7, illustrating one gripping member in "open" and "closed" conditions respectively;

FIG. 9 is a top plan view of the rear gripping members;

FIG. 10 is a bottom plan view of the top member, with the scoring member sub-assembly removed;

FIG. 11 is a cross-section on the line XI—XI of FIG. 10;

FIGS. 12(a), 12(b) and 12(c) are views of the actuating arrangement for the scoring member, at the beginning of a cycle, at a time immediately prior to scoring, and after scoring, respectively, the cross-section generally on a line XII—XII of FIG. 4;

FIGS. 13 and 14 illustrate two operative positions of a ratchet device for ensuring operation of a complete cycle.

As illustrated in the FIGS. 1 to 6, an apparatus comprises a base member 10 and a top member 11. The base member can be adapted for fixing to a bench or table top with pressure on the top member actuating the whole apparatus, or the apparatus can be held in the hand and actuation obtained by gripping the two members and pushing together.

The base member 10 is of generally rectangular plan form with upstanding spaced webs 12 at one end for pivotal attachment of the top member 11. An elongate groove 13 is formed in the bottom surface of the base member, as particularly seen in FIGS. 4, 5 and 6, and in the groove is positioned an elongate cam member 14. Cam member 14 can slide longitudinally in the groove 13 and is urged towards one end of the groove by a spring 15. In the example the spring 15 is at the pivot end, urging the cam member away from the pivot, indicated at 16. The cam member is retained in the groove by a base plate 17. The cam member 14 has three camming formations 18, 19 and 20 spaced along the length of the cam member.

Figure 1:
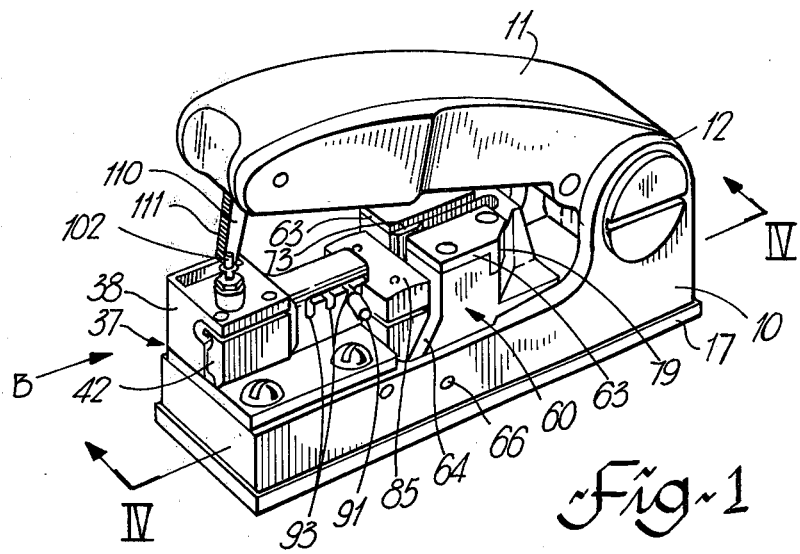
FIG. 1 is a perspective view of one form of apparatus, in an "open" condition.
Figure 3:
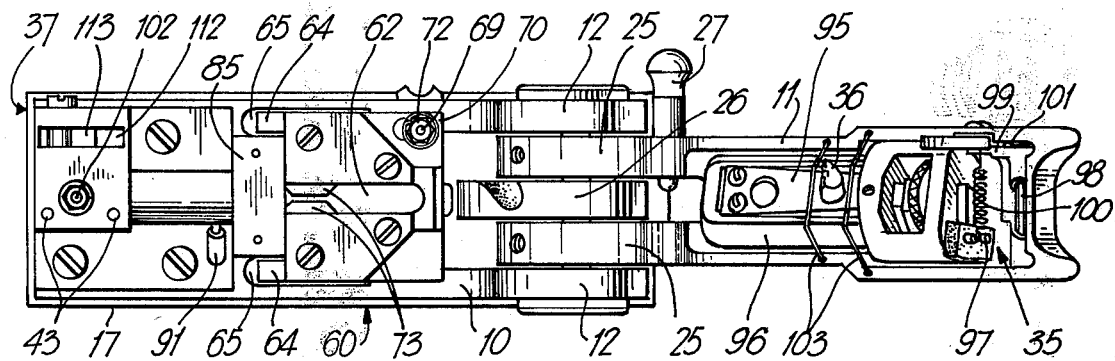
FIG. 3 is a top view in the direction of the arrow A in FIG. 2.

The top member 11 is of elongate, hollow form, as can be seen in FIG. 1, 10 and 11. At one end are two spaced webs 25 which extend between the webs 12 on the base member for pivotal attachment of the top member. Positioned between the two webs 25 is an actuating member 26. The actuating member 26 pivots with the webs 25, and thus with the top member 11, in normal conditions, being connected to the webs 25 via a pin 27. For convenience in inspection and maintenance of the scoring member and actuating device for the scoring member, the top member 11 can be disconnected from the actuating member 26 by withdrawing the pin 27. This situation exists in FIGS. 2 and 3 for example.

Figure 5:
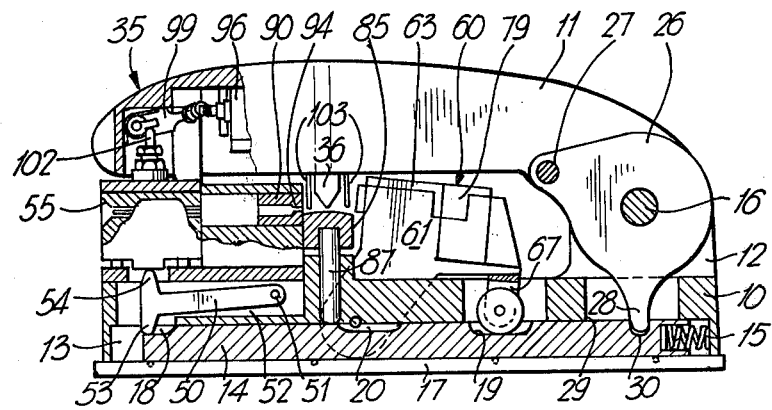
FIG. 5 is a similar cross-section to that of FIG. 4, but with the apparatus in an "operated" or "closed" condition.

The actuating member 26 has a radially extending arm 28 which extends through a slot 29 in the base member 10 and engages in a detent 30 in the cam member 14. By this means, pivotting of the top member relative to the base member slides the cam member longitudinally. In the present example, starting at the relative position of the top member 11 as seen in FIG. 4, pivotal movement downwards of the top member 11 to the position as in FIG. 5, slides the cam member 14 to the right, as seen in FIGS. 4 and 5.

Sliding of the cam member 14 actuates two gripping positions, by camming formations 18 and 19, the formation 19 also causing tensioning of the gripped fibre. Then camming formation 20 actuates a member which bends the fibre at a position between the gripping positions. Final downward movement of the top member causes triggering of the actuating device, indicated generally at 35, for the scoring member 36.

Starting at the end of the apparatus remote from the pivot 16, there is a first gripping position at 37. This gripping position comprises a fixed member 38 attached to the base member 11, the member 38 having a laterally extending top flange 39 and a gripping surface 40 in a recess 41. This is seen more clearly in FIGS. 7 and 8. Also at this gripping position is a moveable member 42. Moveable member 42 slides on two pins 43 supported at the top in the top flange 39 and at the bottom in a further flange 44 on the final member 38. The moveable member has a laterally extending rib 45 which extends into the recess 41 and has a gripping surface 46 in opposition to the gripping surface 40 on the fixed member 38.

The moveable member 42 is biased to a downward, or gripping, position, by a spring 47 acting on an extension 48 of the moveable member 42, and is held up against this spring by a cam lever 50. Cam lever 50 is pivotted at a rear end at 51 in the base member 10, the lever being positioned in a groove 52 in the base member. At the front end the cam lever has a lower extension 53 which rests on the top of the cam member 14, and an upper extension 54 which bears against the base of the moveable member 42. In the example the camming formation 18 in the cam member 14 is a recess and as the cam member slides, the lower extension 53 drops down into this recess, permitting the moveable member 42 to slide downward on the pins 43, with the gripping surface 46 moving towards gripping surface 40. To facilitate entry of a fibre between the gripping surfaces 40 and 46, the front surfaces of the members 38 and 42 are countersunk as shown at 55.

The movement of the lower extension 53 into the camming formation 18 occurs at the early part of the cycle, at the initial downward movement of the top member. Just after this time the rear gripping position is actuated, this position indicated generally at 60. At gripping position 60, there is a pivotally mounted member 61 having a central groove 62 and two thin cap members 63, one on each side of the groove 62. At the forward end of the member 61, two spaced parallel webs 64 extend downwardly into slots 65 in the base member 10. A pivot pin 66 passes through the base member 10 and the webs 64 to pivotally mount member 61. At the rear end of the member 61 two closely spaced downwardly projecting webs 67 pivotally mount a roller 68 which cooperates with the cam member 14. At one side a pin 69 extends up from the base member 10 through a hole in a laterally extending web 70 of member 61. A compression spring 71 is positioned over the pin and is compressed between the web 70 and an enlarged head 72 on the pin 69. The spring 71 urges the roller 68 down into engagement with the cam member 14.

The member 61 carries two inclined gripping jaws 73 sliding in grooves or slots in the member 61. This is illustrated in FIG. 9 where the member 61 is seen with the thin cap members 63 removed, exposing the gripping jaws 73, mounted in grooves 74. The grooves 74 are inclined toward each other and also in a direction towards the front gripping position 37. The jaws 73 are bored at their rear ends, at 76, to house compression springs 77. The springs 77 act to push the jaws forward and inward to a gripping relationship. The forward ends of the jaws have gripping surfaces 78, the surfaces inclined to the axes of the jaws but being parallel to the longitudinal axis of the apparatus. The cap members 63 have downwardly extending projections 79 which close off the rear ends of the grooves 74 and act as abutments for the springs 77.

Under the action of the springs 77 the jaws would normally abut on the apparatus centre-line, but in the non-gripping condition or relationship the jaws are held apart by butting on to a further member—85—positioned in front of the member 61. The member 85 is mounted for vertical movement, relative to the base member 10, on two screws extending up through the base member 10 into the member 85 at positions indicated at 86 in FIG. 3. Compression springs in recesses in the base member act on the screws to urge the member 85 down, towards the base member 10. A central pin 87 has its upper end seated in the member 85 and its lower end rests on the cam member 14. The upper surface 88 of the member 85 is arcuate to present a convex surface to a fibre.

The actuation of the rear gripping position 60 and the member 85 are sequential as the top member 11 continues its downward movement. First the roller 68 moves down into the formation 19 of the cam member 14. This permits pivotting of the member 61 under the action of the spring 71. As the member 61 pivots, it effectively moves rearwardly at the top and this permits the jaws 73 to slide forward under the action of springs 77, gripping a fibre if positioned therebetween. Continued downward movement of the top member 11, with continued sliding of the cam member 14 ceases pin 87 to move upward as the bottom end of the pin moves up out of the formation 20 in the cam member 14. At this time the front gripping position 37 is actuated and the rear gripping position 60 is actuated, any fibre in position being thus gripped, and also tensioned by the pivotting of the member 61 at the rear gripping position. The upward movement of the member 85 causes bending of the fibre over the concave surface 88.

Thus, as so far described, starting from an initial condition, as in FIGS. 1 and 4, downward movement of the top member 11 causes sliding of the cam member 14, to the right in FIGS. 1 and 4, and in sequence first the lever 50 drops as the extension 53 drops down into the formation 18, actuating the front gripping position, then the roller 68 drops down into the formation 19 actuating the second gripping position and then the pin 87 is raised from formation 20 to lift member 85. A fibre is inserted when the top member 11 is up, as in FIGS. 1 and 4. If the fibre is coated as by a plastic material, this coating is first removed for a length at the end. The fibre is then inserted through the front of the front gripping position, between the gripping surface 40 on the fixed member 38 and the gripping surface 46 on the moveable member 42. The countersunk surface 55 aids in insertion of the fibre. The fibre passes between the gripping surfaces 40 and 46, through an axially moveable sleeve 90, over the convex surface 88 of the member 85 and between the jaws 73 of the gripping position. As the top member is moved down the fibre is first gripped at the front gripping position, then gripped and tensioned at the rear gripping position and then bent slightly over surface 88 as member 85 rises. The amount of tension can be varied by varying the compression of spring 71 and this can be obtained either by making the enlarged head 72 of the pin 69 such that it can be screwed down, or by providing some means of moving the pin 69 up and down. The positioning of the fibre is controlled by varying the position of the sleeve 90. In the example a small laterally extending pin 91 is attached to the sleeve 90 and extends through a slot 92 in the base member 10. Small detents 93 in the lower surface of the slot 92 enable the sleeve 90 to be located at one of a number of predetermined positions—in the example three positions. The stripped end of the fibre extends through the sleeve and a small hole 94 at the end of the sleeve acts as an abutment for the plastic coating.

To complete the cycle it is necessary to score the fibre. The scoring member 36 and actuating mechanism 35 therefore is housed in the top member, as stated. The scoring member, in the present example, comprises a diamond mounted in a short holding member which is attached to a cantilevered spring member 95 near its free end, the member 95 attached at its other end to a rotatable housing 96. Housing 96 is mounted at each end in the top member 11 and at its forward end has an over-centre spring action device. A pin 97 extends from the front end of the housing 96. Extending transversely at the end of the interior of the top member is a pin 98 having a radially extending lever 99. A tension spring 100 extends between the outer end of lever 99 and the pin 97. Normally the lever 99 is rotated to a downward position—anticlockwise in FIG. 4, by a coil spring 101 around the pin 98 at one end. This pulls down one end of the spring and causes the housing to be rotated to one of two alternate positions.

From the fixed member 38, at the front gripping position, a pin 102 extends upwards, the amount by which it extends conveniently being adjustable by making it with a threaded shank which screws into a threaded hole in the member 39. As the top member is moved down, the top of pin 102 makes contact with the lever 99. The pin 102 pushes the lever 99 up, moving up one end of the spring 100. Eventually the spring moves across the rotational axis of the housing 96. As soon as the spring 100 moves across this axis it causes the housing 96 to rotate to the other of the two alternate positions. In so rotating the housing moves the scoring member in an arc, the diamond sweeping across the fibre stretched over the member 85. The diamond makes a very small, fine, scratch on the surface of the fibre. Under the stretching or tensile stress and the bending stress applied to the fibre by the gripping members and member 85, the scratch propagates across the fibre giving a flat smooth break. To ensure that the fibre is resting on surface 88, two spaced spring pressure members 103 can be provided in the top member.

The sequence of pushing up the lever 99 and rotating the housing 96 is illustrated in FIGS. 12a, b and c. In FIG. 12a the lever 99 is in its downward position and the spring 100 extends between the lever 99 and pin 97 below the axis of rotation of the housing 96, this axis being at 104. As lever 99 is pushed up the spring 100 crosses or passes the axes 104, as illustrated in FIG. 12b. The housing 96 then rotates, the scoring member 36 sweeping across as illustrated in FIG. 12c. In FIGS. 12b and 12c is also seen the convex surface 88 of member 85 and a fibre 105. Surfaces 106 on the housing 96 provide stops for limiting rotation of the housing. On release of the top member, coil spring 101 rotates the lever 99 back and the reverse of the sequence illustrated in FIGS. 12a, b and c occurs, rotating the housing 96 back to its original position.

The rotation of the housing 96 and movement of the scoring member 36 occurs right at the end of the downward movement of the top member 11. To ensure that the cycle is completed, and that the top member 11 is not raised until after movement of the scoring member, a ratchet device can be provided which once engaged on initial movement of the top member, will not release until the top member has been moved completely down.

Figure 2:
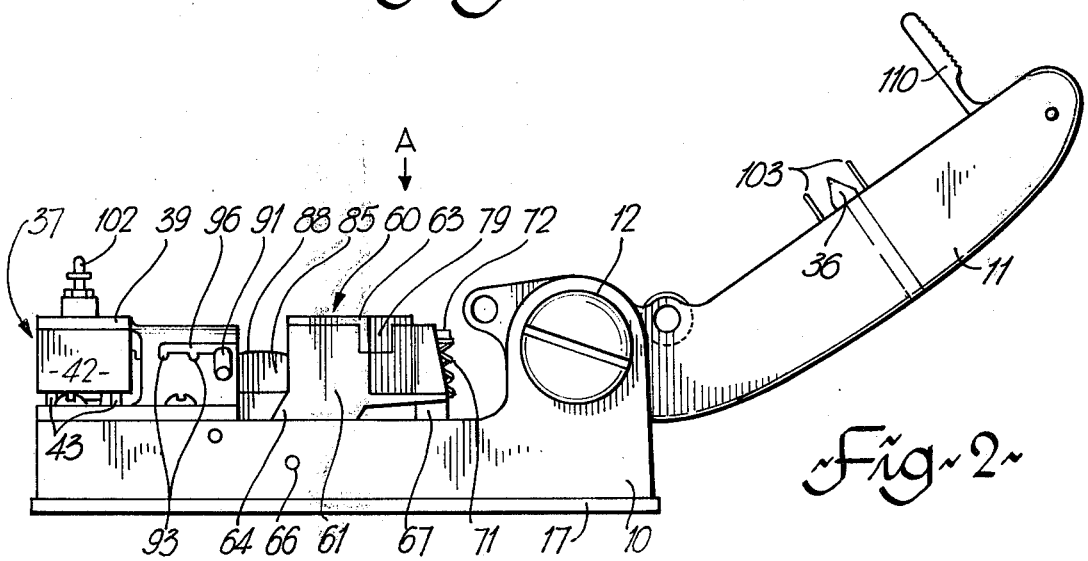
FIG. 2 is a side view of the apparatus illustrated in FIG. 1, but with the top member opened to full extent.

In the example illustrated, and particularly as seen in FIGS. 1 and 2, and in more detail in FIGS. 13 and 14, a finger 110 having a serrated edge 111 is attached to and extends down from the top member 11. The finger enters a deep slot 112 in the fixed member 38 at the front gripping position 37. As the finger 110 moves down into the slot, the serrated edge 111 engages with a spring loaded ratchet member 113. FIG. 13 illustrates the position of the finger 110 relative to the ratchet member 113 prior to carrying out a cycle, that is generally as illustrated in FIGS. 1 and 4. As the top member 11 is moved down the finger rests, and pushes down, the ratchet member 113 aginst the spring 114. The end of the ratchet member 113 engages in the serrations on the serrated edge 111. The ratchet member engages successively with successive serrations as the finger 110 enter further into the slot 112, that is as the top member moves down. This is as illustrated in FIG. 14, which is of a relative position of finger and ratchet member just prior to complete downward movement of the top member.

It will be seen from FIG. 14 that, once the ratchet member 113 is engaged with the serrated edge of the finger 110, any attempt to release the top member 11 will be prevented by jamming of the ratchet member between its pivot 115 and the finger. Downward movement of the finger 110 must continue until a concave cut-out 116 in the finger 110 is opposite the ratchet member 113, when the ratchet member is released and can swing round and up to permit the serrated edge 111 of the finger to move upwards.

What is claimed is:

1. Apparatus for breaking an optical fibre, comprising:
    a base member of elongate plan form;
    an elongate cam member longitudinally slidable in said base member;
    a top member extending over said base member and pivotally attached at a rear end to a rear end of said base member;
    means extending between said top member and said cam member, whereby pivotal movement of said top member slides said cam member longitudinally;
    a front gripping means on said base member at a front end;
    a rear gripping means spaced from said front gripping means towards said rear end;
    bending means positioned between said front and rear gripping means;
    actuating means extending between said cam member and each of said front gripping means, said rear gripping means and said bending means, whereby longitudinal sliding of said cam member actuates said front and rear gripping means and said bending means in a predetermined sequence;
    and scoring means pivotally mounted in said top member, said scoring means arranged to move across a fibre extending over said bending means, on closure of said top member on to said base member, to score said fibre and generate a break therein.

2. Apparatus as claimed in claim 1, said front gripping means comprising a fixed gripping member and a movable gripping member, said gripping members having opposed gripping surfaces; resilient means urging said moveable member to a closed position with said opposed gripping surfaces in a gripping position, said cam member including a first portion for lifting the related actuating means to move said moveable member to an open position and a second portion lowering said related actuating means to permit said moveable member to move to said closed position.

3. Apparatus as claimed in claim 1, said rear gripping means comprising a member pivotally mounted on said base member and resiliently biased for pivotal movement away from said front gripping means, and including two jaw members slidable in said member, said jaw members positioned one on each side of an axis extending longitudinally of the base member and inclined inwardly toward said axis and toward said front gripping means; resilient means urging said jaws toward each other to a gripping position; said cam member including a raised portion for lifting the related actuating means to pivot said member toward said first gripping means, inner ends of said jaws abutting a member on said base member and urged rearwardly to an open position, said cam member further including a further lowered portion for lowering said related actuating means to permit pivotal movement of said member away from said front gripping means, and permitting said jaws to slide toward each other to a gripping position, after actuation of said front gripping means.

4. Apparatus as claimed in claim 3, including a spring resiliently biasing said pivotally mounted member, said spring acting on said pivotally mounted member during and after movement of said jaws to a gripping position on a fibre, whereby said fibre is tensioned.

5. Apparatus as claimed in claim 3, said bending means spaced from said front gripping means and fibre positioning means positioned between said front gripping means and said bending means, said inner ends of said jaws butting on to said bending member when said rear gripping means is in a non-gripping position.

6. Apparatus as claimed in claim 5, said fibre positioning means including an axially slidable member for engagement with a plastic coated section of a fibre end stripped of the plastic coating, whereby the end of the plastic coating can be prepositioned relative to the scoring means.

7. Apparatus as claimed in claim 1, said bending means comprising a member mounted on said base member for upward movement relative to said base member, said cam member including a portion for lifting the related actuating means to lift the member on longitudinal movement of the cam member; resilient means urging the member downwards, said cam member including a lowered portion for lowering said actuating means and lowering of said member; said member including a convex upper surface for contact with a fibre, after actuation of said front and rear gripping means.

8. Apparatus as claimed in claim 1, including an actuating member extending upwards from said base member adjacent the contact means on said scoring means, whereby on closure of said top member on said base member, said actuating member contacts said contact means to pivot said scoring means.

9. Apparatus as claimed in claim 8, said scoring means mounted for pivotal movement about an axis extending longitudinally of said top member and having an end surface adjacent to a front end of said top member, a tension spring extending across said end surface, said spring attached at one end to said contact means and at its other end to a position on said end surface, said spring extending on either side of said axis, and below said axis in one of two alternate positions of said contact means, and extending above said axis in the other of said two alternate positions of said contact means, whereby, on actuation of said contact means said spring moves across said axis and pivots said scoring means.

10. Apparatus as claimed in claim 8, including an elongate member extending downward from said top member adjacent the front end thereof and including a serrated edge, a ratchet member on said base member for engagement with said serrated edge, and a recess in said elongate member above said serrated edge, said ratchet member preventing withdrawal of said elongate member until said ratchet member enters said recess, and said recess positioned so that said ratchet member enters said recess after actuation of said scoring means by said actuating member.

11. Apparatus as claimed in claim 1, including resilient members attached to said top member above said bending means to press a fibre down on to said bending means.

12. Apparatus as claimed in claim 1, said cam member positioned in a groove in a bottom surface of the base member, said cam member including an upper surface having a series of recesses therein spaced along the cam member, a recess for each actuating means extending between said cam member and said front and rear gripping means and said bending means.

13. Apparatus as claimed in claim 12, said means extending between said top member and said cam member comprising an arm connected to said top member and a further recess in said cam member, said arm extending into said further recess, whereby on pivotal movement of said top member said arm slides said cam member.

14. Apparatus as claimed in claim 1, said base member including two upwardly extending parallel webs at said rear end, said top member including two parallel downwardly extending webs at said rear end, the webs on the top member spaced apart to fit closely outside of the webs on the base member, and a pivot member extending through said webs, said means extending between said top members and said cam member comprising a further web positioned between the webs on said base member and having an extension engaging with said cam member, said further web connected to and pivotting with said top member.

15. Apparatus as claimed in claim 14, including a removable pin extending through said further web and said top member, for releasably connecting said further web to the top member.

16. Apparatus as claimed in claim 1, said scoring means including a cantilever extending parallel to the pivotal axis of the scoring member and a scoring member attached to the free end of the cantilever.

* * * * *